United States Patent [19]
Dockery

[11] 3,881,622
[45] May 6, 1975

[54] GRIPPING END OF PARISON TO FORM BOTTLE HAVING PLURALITY OF GROOVES AT NECK END

[75] Inventor: Calvin D. Dockery, Bartlesville, Okla.

[73] Assignee: Phillips Petroleum Company, Bartlesville, Okla.

[22] Filed: Aug. 20, 1973

[21] Appl. No.: 389,735

[52] U.S. Cl. ................................................ 215/31
[51] Int. Cl. ............................................. B65d 1/02
[58] Field of Search ................ 215/1 C, 31; 138/109

[56] References Cited
UNITED STATES PATENTS

| | | | |
|---|---|---|---|
| 2,106,464 | 1/1938 | Meyer | 215/31 UX |
| 2,788,161 | 4/1957 | Kemper | 215/31 UX |
| 3,419,172 | 12/1968 | Lee | 215/32 |
| 3,651,186 | 3/1972 | Hall | 215/1 C |
| 3,804,285 | 4/1974 | Kraas | 215/31 X |

Primary Examiner—Donald F. Norton

[57] ABSTRACT

An open end parison preform heated to orientation temperature is gripped at one end thereof with a jaw means which makes initial contact with the parison around a plurality of annular areas adjacent an open end thereof. This allows for the parison to be held securely at the very end as a plug is thereafter introduced into the interior of the parison to expand same out and produce threads adjacent the area being held. This allows for the production of a smooth top finish on the neck portion of a bottle for instance so that a cat wiil seal securely.

5 Claims, 3 Drawing Figures

PATENTED MAY 6 1975    3,881,622

GRIPPING END OF PARISON TO FORM BOTTLE HAVING PLURALITY OF GROOVES AT NECK END

BACKGROUND OF THE INVENTION

This invention relates to the production of molecularly oriented hollow articles.

In the production of hollow articles such as bottles, it is necessary to have a smooth top finish to the neck portion of the bottle so that a cap will form a good seal as a result of uniform contact with the top of the neck area. With conventional blow molding utilizing free extrusion of a thoroughly molten parison, products are obtained which generally require reaming and trimming of the neck area. While this trimming operation can be utilized to give a good flat surface to the end of the neck area it nonetheless involves an extra step. One advantage of utilizing tubular material cut to individual lengths to form an open end parison preform is that no trimming operations are required. However, with parison preforms at orientation temperature, the force required to insert a plug into the parison to force same out into conformity with the thread forming zone can result in pushing the parison back slightly. Thus while it would be desired to have the end of the parison against a smooth forming means during this operation, as a practical matter it may be pushed axially away from such a forming means by a fraction of an inch and thus develop an uneven surface.

SUMMARY OF THE INVENTION

It is an object of this invention to provide molecularly oriented hollow articles such as bottles having a smooth face at an open end thereof;

it is a further object of this invention to provide high quality oriented bottles capable of being capped without being susceptible to leaking at the cap; and it is yet a further object of this invention to provide a method whereby a parison preform is held adjacent an open end thereof by means having a plurality of small ridges which apply pressure to the parison to prevent it from slipping as a plug is inserted.

In accordance with this invention an open end parison preform, heated to orientation temperature, is initially gripped by a means having a plurality of small ridges which apply pressure adjacent the open end of the neck portion thereof so as to hold said parison as a plug is inserted in this end to expand same out into conformity with a thread forming zone.

BRIEF DESCRIPTION OF THE DRAWINGS

In the drawings forming a part hereof wherein like reference characters denote like parts in the various views.

DESCRIPTION OF THE PREFERRED EMBODIMENTS

Figure 1:
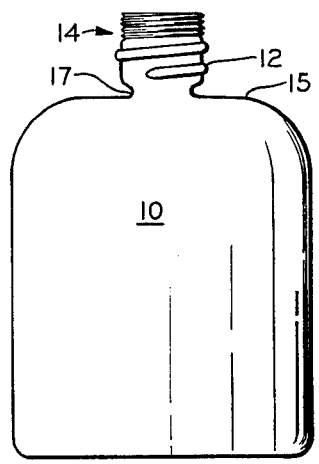
FIG. 1 is a perspective view of a bottle in accordance with the invention.

The instant invention is applicable to the formation of any hollow article such as a container, toy, or the like where a smooth finish on an open end thereof is required although it is of primary utility in the formation of bottles where it is necessary to have a smooth top to the neck portion so as to form a seal with a cap.

The invention is applicable to the production of said articles from any orientable thermoplastic materials such as polyolefins, nylon, polystyrene, ABS and other butadiene-styrene containing copolymers, poly(vinyl chloride), poly(vinylidene chloride) polymers, polyesters, and the like. Preferred materials are crystalline polymers such as polymers of at least one mono-1-olefin having two to eight carbon atoms per molecule, more preferably polymers and copolymers of ethylene, propylene, and butene, most preferably polypropylene.

The fabrication process is carried out at orientation temperature which for crystalline polymers is generally 1° to 50°, preferably 5° to 25°F below the crystalline melting point. For amorphous polymers a temperature of 40° to 200°, preferably 75° to 150° F below the homogeneous melt point is satisfactory. Generally the parison will be stretched axially 1.1:1 to 8:1, preferably 1.5:1 to 2.5:1 by mechanical means and thereafter expanded by fluid pressure to conform with a molding zone to give biaxial orientation.

It is broadly known to produce biaxially oriented hollow articles from thermoplastic parison preforms as shown in Gilbert, U.S. Pat. No. 3,686,379, issued Aug. 22, 1972, the disclosure of which is hereby incorporated by reference. It is preferred in accordance with the invention of this application that the mold means be disposed upside down so that the thread forming means is at the lower end thereof.

The axial length of the section of the neck having the annular grooves imparted thereto (gripping section) will of course vary depending on the size of the bottle generally being 0.2 to 1 times the axial length of the thread area. For typical bottles having a volume of a pint to a quart this dimension will generally be in the range of 0.1 to 0.5 inches. The grooves imparted to the neck area can vary in depth but need only be deep enough for the gripping means to hold the parison as the thread forming plug is inserted. A depth of the grooves (or height of the ridges) of 3 to 30, preferably 4 to 10 mils is satisfactory. The axial spacing from the center of one groove to the center of another can vary widely and will generally be in the range of 20 to 100, preferably 25 to 50 mils. It is essential that the means for forming these grooves on the neck forming apparatus extend beyond the furthermost extension of the furrow forming portion of the thread forming means. This extension can vary from 1 to 100 mils, preferably 25 to 50 mils. Thus with a typical groove depth of 4 to 10 mils the furthermost outward radial extension (diameter) of the ridges in the gripping section of the final article will preferably be less than the furthermost outward radial extension (diameter) of the grooves in the thread forming section. Optionally there can be a "bite" ring adjacent the shoulder-forming portion of the mold means to prevent major axial slipping, the ridges of the invention serving a more subtle function of preventing minor slippage adjacent the end where precision in the finish of the lip is essential.

Referring now to the drawings, particularly FIG. 1 there is shown a bottle 10 in accordance with the invention. The neck portion of the bottle is divided into a gripped section 14 and a thread section 12, said thread section being disposed between said gripped section 14 and shoulder 15. The indentation 17 is formed by a single bite ring.

Figure 2:
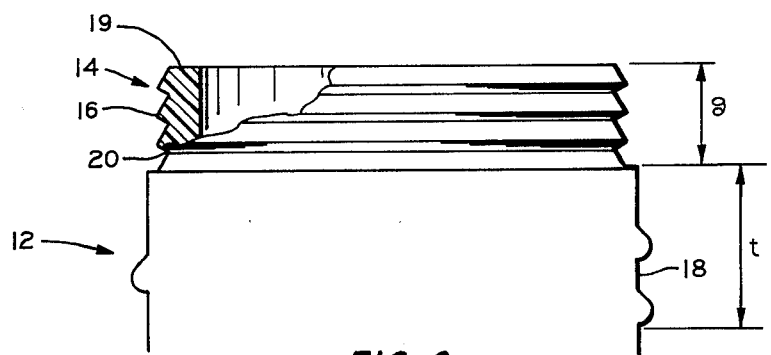
FIG. 2 is a detailed view of the neck portion of said bottle showing the flat smooth surface of the neck end.

FIG. 2 shows the neck portion of the bottle in greater detail. As can be seen the furthermost extension of ridges 16 on the gripping portion is less than the furthermost radial extension of the furrows 18 of the thread section. As can be seen, the upper surface 19 of the neck portion is smooth and even. The axial height *g* of gripped section 14 is a little less than one-half the axial height *t* of thread section 12. Also as can be seen the furthermost outward radial extension of the gripping area as embodied by ridges 16 is less than the smallest radial extension of the thread area as evidenced by furrow 18. The number of ridges 16 and grooves 20 in gripping section 14 must be at least 2 and preferably 2 to 20, more preferably 3 to 6.

Figure 3:
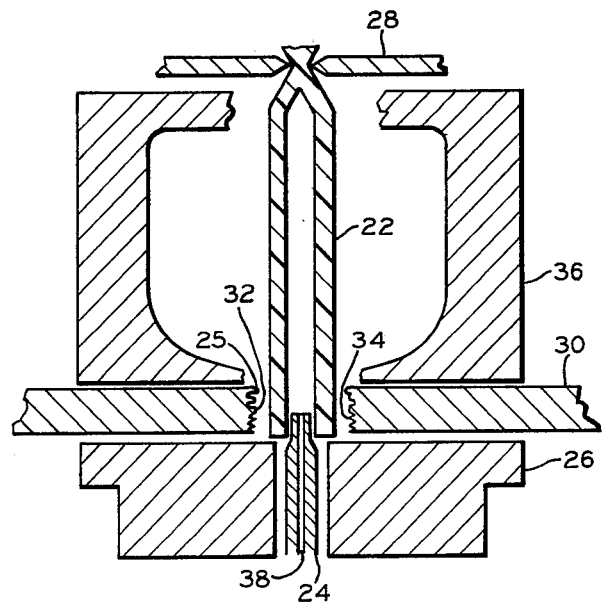
FIG. 3 is a sectional view of apparatus having means to grip an open end of a parison as a plug is inserted to form the threads.

Referring now to FIG. 3 there is shown a parison 22 which is placed over a smaller diameter extension of plug 24. Parison 22 can be formed and heated to orientation temperature in a manner shown in said Gilbert patent referred to hereinabove. The end of parison 22 rests on bushing 26. Parison 22 is held at the other end thereof by a gripping means 28. Jaw members 30 having thread forming means 32 and gripping means 34, then close sufficiently on the parison for gripping means 34 to contact said parison and hold same as plug 24 is advanced axially into the parison to expand same out into contact with said thread forming means for the first time. The parison, optionally can be held from major axial movement by bite ring 25. Member 28 is then moved upwardly to give axial stretching to the parison and thereafter mold halves 36 are closed to seal and sever the portion of the parison forming the bottom of the bottle. Finally fluid pressure is introduced via conduit 38 to expand said parison out into conformity with the mold walls.

EXAMPLE

Polypropylene homopolymer having a density of 0.905 (ASTM D 1505-63T), a melt flow of 2 (ASTM D 1238-62T, condition L), and a crystalline melting point of about 340°F was extruded into tubing having an outside diameter of 1.181-inch and a wall thickness of 0.125-inch. The tubing was cooled to room temperature in a vacuum sizing and quenching chamber and cut into 5-inch lengths. These lengths were heated to a temperature of about 320°F and inserted into a neck forming apparatus such as is shown in the drawings. The neck forming portion closed on the parison to grip same adjacent an open end thereof and a plug was moved axially into the parison to expand same out into conformity with the thread forming portion of the neck. Thereafter internal fluid pressure of 150 psig was introduced to expand the parison out into conformity with the rest of the mold. The resulting 10 ½-ounce bottle had a smooth even finish on the end of the neck. The resulting bottle had a total axial length of the gripping section (the section of the neck between the lip of the opening and the start of the threads) of 0.159 inches. There were four identical grooves and ridges formed in the gripping section, each complete groove and ridge having an axial dimension of 0.32 inches and the depth of each groove being 0.006 inches. The maximum outside diameter of the gripping section was 0.806 inches.

While this invention has been described in detail for the purpose of illustration it is not to be construed as limited thereby but is intended to cover all changes and modifications within the spirit and scope thereof.

What is claimed is:

1. A biaxially oriented hollow article of a thermoplastic polymer having a neck portion comprising a smooth top surface, a thread section, and a plurality of annular ridges around the outside of said neck between said top surface and said thread section, a furthermost radial extension of grooves between said ridges being less than a furthermost radial extension of furrows between threads of said thread section.

2. An article according to claim 1 in the form of a bottle, said ridges being smaller than said threads.

3. An article according to claim 2 wherein the axial length of a section encompassing said plurality of ridges is within the range of 0.2 to 1 times the axial length of said thread area and wherein said ridges have a height within the range of 3 to 30 mils.

4. An article according to claim 2 wherein said article is made of polypropylene.

5. An article according to claim 4 in the form of a bottle wherein the axial length of said section encompassing said plurality of ridges is within the range of 0.1 to 0.5 inches and the height of said ridges is within the range of 4 to 10 mils, the furthermost radial extension of said ridges being less than the smallest radial extension of said furrows in said thread area.

* * * * *